United States Patent
Iwase et al.

(10) Patent No.: US 10,348,954 B2
(45) Date of Patent: **\*Jul. 9, 2019**

(54) IMAGE ACQUISITION DEVICE AND METHOD AND SYSTEM FOR CREATING FOCUS MAP FOR SPECIMEN

(71) Applicant: HAMAMATSU PHOTONICS K.K., Hamamatsu-shi, Shizuoka (JP)

(72) Inventors: Fumio Iwase, Hamamatsu (JP); Masatoshi Okugawa, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 51 days.

This patent is subject to a terminal disclaimer.

(21) Appl. No.: 14/786,581

(22) PCT Filed: Apr. 21, 2014

(86) PCT No.: PCT/JP2014/061182
§ 371 (c)(1),
(2) Date: Oct. 23, 2015

(87) PCT Pub. No.: WO2014/175220
PCT Pub. Date: Oct. 30, 2014

(65) Prior Publication Data
US 2016/0080632 A1   Mar. 17, 2016

(30) Foreign Application Priority Data

Apr. 26, 2013  (JP) .................................. 2013-094079
Oct. 24, 2013  (JP) .................................. 2013-221175

(51) Int. Cl.
G02B 21/00   (2006.01)
H04N 5/232   (2006.01)
(Continued)

(52) U.S. Cl.
CPC ........... *H04N 5/23212* (2013.01); *G02B 7/36* (2013.01); *G02B 21/006* (2013.01);
(Continued)

(58) Field of Classification Search
CPC ... G09B 9/00; H04N 7/18; H04N 7/00; G02B 21/00; G02B 21/36; G01B 11/00; G01B 11/24; G06T 7/00; G06T 5/00; G06T 5/50
See application file for complete search history.

(56) References Cited

U.S. PATENT DOCUMENTS 6,677,565 B1   1/2004   Wahl et al.
7,518,652 B2   4/2009   Olson et al.
(Continued)

FOREIGN PATENT DOCUMENTS

CN   101031837   9/2007
CN   102645160   8/2012
(Continued)

OTHER PUBLICATIONS

International Preliminary Report on Patentability dated Nov. 5, 2015 for PCT/JP2014/055987.
(Continued)

*Primary Examiner* — Maryam A Nasri
(74) *Attorney, Agent, or Firm* — Drinker Biddle & Reath LLP

(57) ABSTRACT

An image acquisition device reciprocates a focal position of an objective lens with respect to a sample in the optical axis direction of the objective lens, while moving a field position of the objective lens with respect to the sample. This makes it possible to acquire contrast information of image data at the field position of the objective lens sequentially as the field position moves with respect to the sample. The image acquisition device acquires the image data by the rolling
(Continued)

readout of the image pickup element according to the reciprocation of the focal position of the objective lens.

10 Claims, 10 Drawing Sheets

(51) Int. Cl.
*G02B 7/36* (2006.01)
*G02B 21/24* (2006.01)
*G02B 21/36* (2006.01)

(52) U.S. Cl.
CPC ......... *G02B 21/244* (2013.01); *G02B 21/365* (2013.01); *G02B 21/367* (2013.01)

(56) References Cited

U.S. PATENT DOCUMENTS

| | | | |
|---|---|---|---|
| 2003/0136980 A1* | 7/2003 | Lin | H01L 27/14625 257/215 |
| 2004/0051030 A1* | 3/2004 | Olszak | G06T 1/0007 250/208.1 |
| 2005/0258335 A1* | 11/2005 | Oshiro | G02B 21/244 250/201.3 |
| 2005/0270611 A1 | 12/2005 | Oshiro et al. | |
| 2006/0017001 A1 | 1/2006 | Donders et al. | |
| 2007/0206097 A1* | 9/2007 | Uchiyama | G02B 21/367 348/207.99 |
| 2008/0049309 A1 | 2/2008 | Tanikawa et al. | |
| 2008/0223839 A1* | 9/2008 | Maruyama | B23K 26/03 219/121.83 |
| 2009/0073305 A1 | 3/2009 | Yuba et al. | |
| 2010/0155577 A1* | 6/2010 | Kiesel | G01N 15/1056 250/208.2 |
| 2014/0152793 A1* | 6/2014 | Staker | G02B 21/361 348/79 |
| 2014/0168640 A1* | 6/2014 | Gouch | G02B 21/245 356/123 |
| 2015/0022651 A1 | 1/2015 | Wu | |
| 2015/0309298 A1* | 10/2015 | Nagai | G02B 7/28 359/363 |

FOREIGN PATENT DOCUMENTS

| | | |
|---|---|---|
| CN | 102687056 | 9/2012 |
| EP | 1 830 217 | 9/2007 |
| EP | 1 865 354 | 12/2007 |
| EP | 2 490 069 | 8/2012 |
| JP | H08-320430 A | 12/1996 |
| JP | 2006-343573 A | 12/2006 |
| JP | 2008-507719 A | 3/2008 |
| JP | 2009-069197 A | 4/2009 |
| JP | 2009-522604 A | 6/2009 |
| JP | 2010-256530 A | 11/2010 |
| JP | 2011-081211 | 4/2011 |
| JP | 2012-042970 A | 3/2012 |
| JP | 2012-073285 A | 4/2012 |
| JP | 2012-108184 A | 6/2012 |
| JP | 2012-138068 A | 7/2012 |
| JP | 2012-212155 A | 11/2012 |
| WO | WO-2005/114293 A1 | 12/2005 |
| WO | WO-2006/008637 A1 | 1/2006 |
| WO | WO-2007/079397 A2 | 7/2007 |
| WO | WO 2007/095090 | 8/2007 |
| WO | WO 2010/048584 | 4/2010 |
| WO | WO 2011/080670 | 7/2011 |
| WO | WO 2011/145016 | 11/2011 |
| WO | WO 2011/161594 | 12/2011 |
| WO | WO-2012/002893 A1 | 1/2012 |
| WO | WO 2013/017855 | 2/2013 |

OTHER PUBLICATIONS

International Preliminary Report on Patentability dated Nov. 5, 2015 for PCT/JP2014/055988.
International Preliminary Report on Patentability dated Nov. 5, 2015 for PCT/JP2014/061180.
International Preliminary Report on Patentability dated Nov. 5, 2015 for PCT/JP2014/061182.
U.S. Office Action dated May 23, 2017 that issued in U.S. Appl. No. 14/786,576 including Double Patenting Rejections on pp. 3-7.

* cited by examiner

Fig.7
(a)
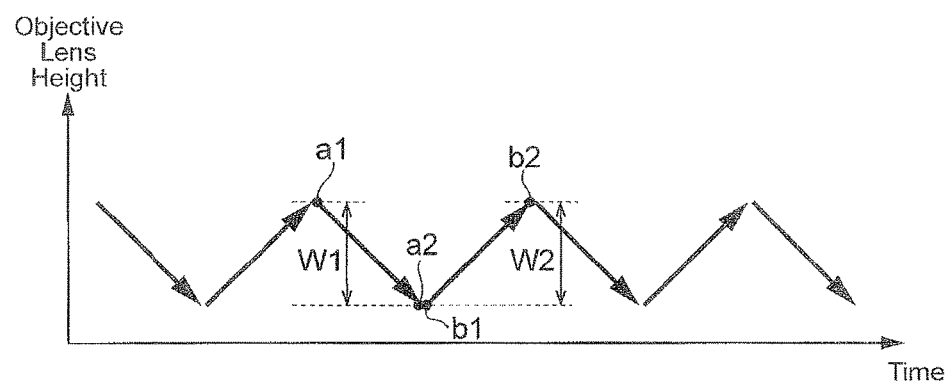
(b)
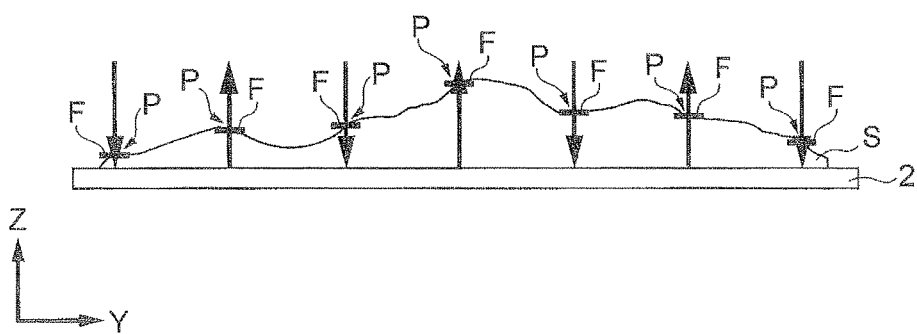

Fig.8
(a)
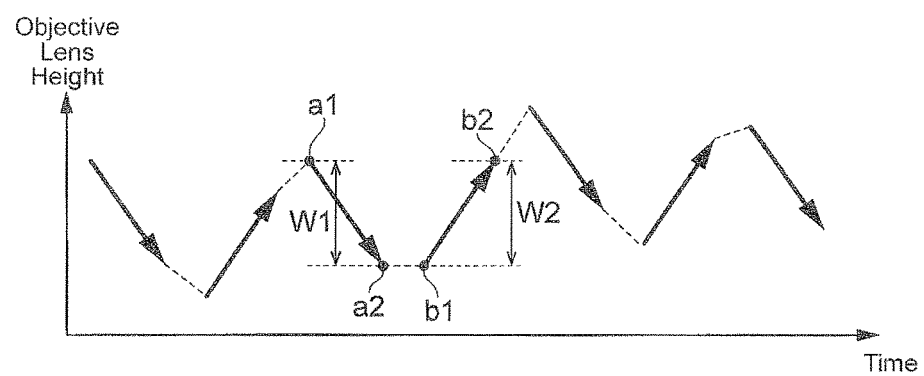
(b)
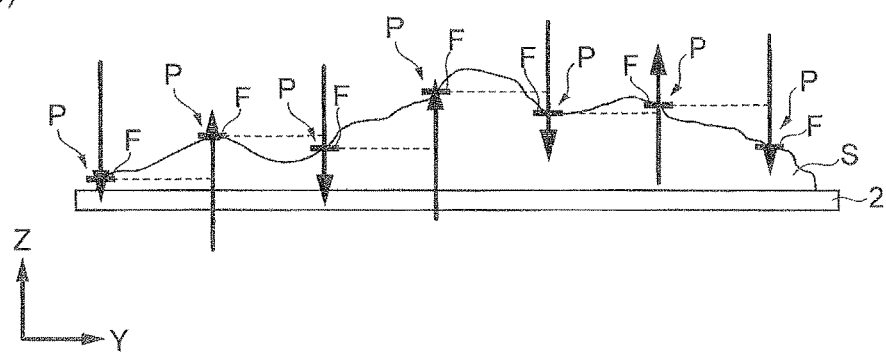

Fig.9
(a)
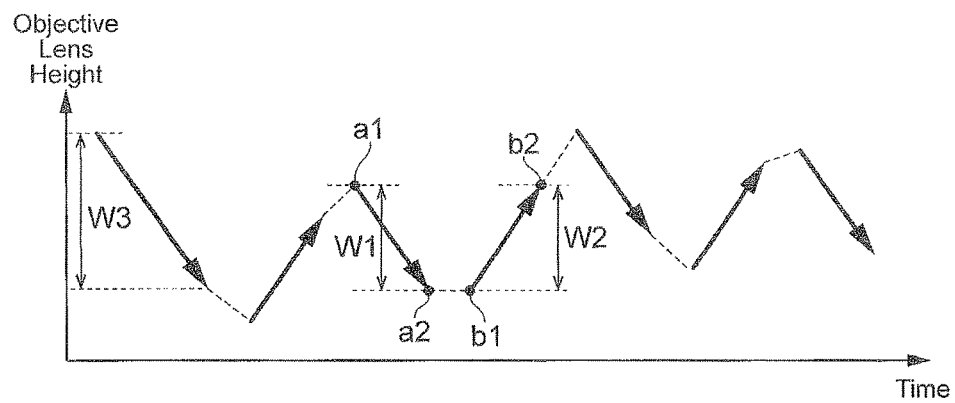
(b)
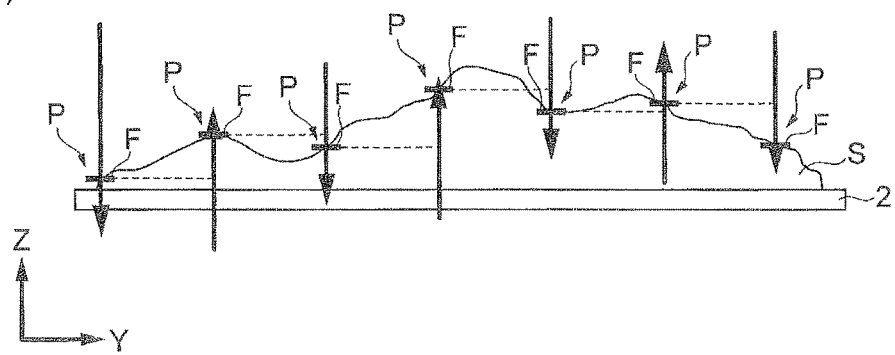

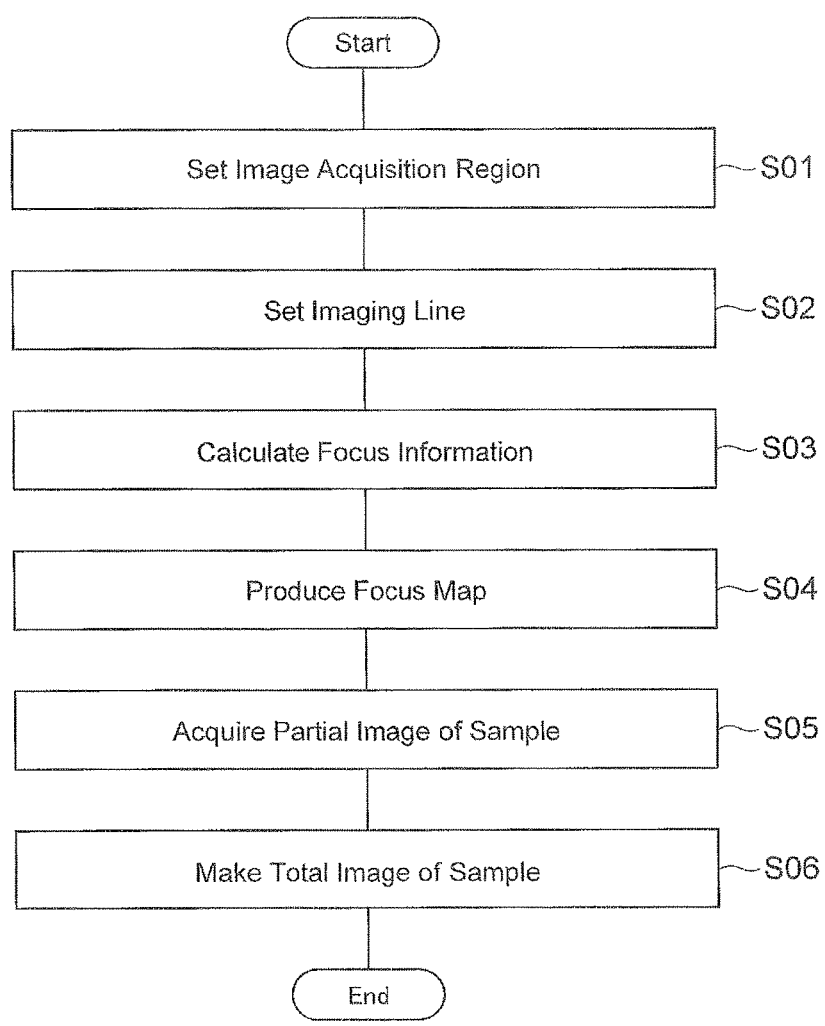

ature 1. The scheme of Patent Literature 2 may also fail to
IMAGE ACQUISITION DEVICE AND METHOD AND SYSTEM FOR CREATING FOCUS MAP FOR SPECIMEN

TECHNICAL FIELD

The present invention relates to an image acquisition device and a method and system for producing a focus map of a sample.

BACKGROUND ART

In an image acquisition device for observing a sample such as a tissue cell, when the distance between the sample on the stage and an objective lens is kept constant, irregularities on a surface of the sample may have an out-of-focus region mixed in an image. Therefore, image acquisition devices employing various focusing methods such as a dynamic focus scheme which captures an image of the sample while acquiring focus information and a prefocus scheme which acquires focus information before capturing the image of the sample have been developed.

Known as an example of such image acquisition devices is a microscope device disclosed in Patent Literature 1. This device is equipped with an image pickup element, drivable in a rolling shutter mode, having a plurality of pixel lines. A light source is caused to emit light intermittently at an interval longer than the light-receiving time of each pixel line, and focal position information of a microscope optical system is acquired according to images captured while moving a stage.

A slide scanner disclosed in Patent Literature 2, for example, continuously reciprocates the focal position of an objective lens while moving a field position of the objective lens with respect to a sample, and acquires image data of the sample by using a line scan camera. This slide scanner calculates an in-focus position of the sample according to the height of a contrast value of the acquired image data for each predetermined region, thereby producing a focus map of the sample as a whole.

CITATION LIST

Patent Literature

Patent Literature 1: Japanese Patent Application Laid-Open No. 2012-108184
Patent Literature 2: U.S. Pat. No. 7,518,652

SUMMARY OF INVENTION

Technical Problem

The above-mentioned image acquisition devices are used as microscope devices which perform imaging at a high magnification of 20× to 40×, for example, and thus may have such a small depth of field that the field of the microscope optical system is very small as compared with the sample. Therefore, for acquiring focus information of the sample as a whole, it is necessary to perform imaging while moving the field of the microscope optical system, though the device disclosed in Patent Literature 1 does not move the field position of the objective lens with respect to the sample and thus takes time for acquiring focus information over a wide area of the sample. Light is inputted to the first and last pixel columns to be read out from respective positions different from each other on the sample, whereby the accuracy of focus information calculated according to a comparison between contrast values may become insufficient.

On the other hand, the device disclosed in Patent Literature 2 acquires image data of the sample with the line scan camera while reciprocating the objective lens in the height direction with respect to the sample. However, the image data are generated by light from positions different from each other on the sample, whereby the accuracy of focus information calculated according to a comparison between contrast values may become insufficient as in Patent Literature 1. The scheme of Patent Literature 2 may also fail to stabilize the number of pieces of focus information acquired for each scan, whereby the accuracy of producing the focus map may become insufficient.

For solving the problems mentioned above, it is an object of the present invention to provide an image pickup device and a method and system for producing a focus map of a sample, which can produce the focus map rapidly and accurately.

Solution to Problem

For solving the above-mentioned problems, the image acquisition device in accordance with one aspect of the present invention comprises a stage for mounting a sample; a lightguide optical system including an objective lens arranged so as to oppose the sample on the stage; an image pickup element for capturing an optical image of the sample guided by the lightguide optical system; a focus calculation unit for calculating focus information of the sample according to image data from the image pickup element; a focus map producing unit for producing a focus map of the sample according to the focus information; a first drive unit for moving a field position of the objective lens with respect to the sample; a second drive unit for changing a focal position of the objective lens with respect to the sample; and a controller for controlling the image pickup element, first drive unit, and second drive unit; the image pickup element is a two-dimensional image pickup element, adapted to perform rolling readout, having a plurality of pixel columns; the controller controls the first and second drive units so as to reciprocate the focal position of the objective lens with respect to the sample in an optical axis direction of the objective lens while moving the field position of the objective lens with respect to the sample and acquires the image data by the rolling readout of the image pickup element; the focus map producing unit produces the focus map according to a plurality of pieces of the focus information calculated by the focus calculation unit.

This image acquisition device reciprocates the focal position of the objective lens with respect to the sample in the optical axis direction of the objective lens (the height direction of the sample) while moving the field position of the objective lens with respect to the sample. This makes it possible to acquire contrast information of image data at the field position of the objective lens sequentially as the field position moves with respect to the sample. The image acquisition device acquires the image data by the rolling readout of the image pickup element. This stabilizes the number of pieces of focus information calculated for each scan of the focal position of the objective lens. Therefore, the focus map can be produced rapidly and accurately.

The controller may have a range determination unit for determining a condition for the reciprocation of the focal position of the objective lens with respect to the sample in the optical axis direction of the objective lens caused by the second drive unit. Though there may be a case where irregularities on the surface of the sample and warpage of a glass slide and the like mounting the sample are not negligible, focus information can be calculated more securely for various samples if the condition for the reciprocation of the focal position of the objective lens is determined.

When calculating one piece of focus information, the range determination unit may determine the focal position of the objective lens at a turning point of the reciprocation according to a piece of focus information calculated before the one piece of focus information. This can prevent the reciprocation of the focal position of the objective lens from straying from the surface of the sample even when irregularities on the surface of the sample and warpage of a glass slide and the like mounting the sample are not negligible. Therefore, the focus information can be calculated more securely.

The range determination unit may vary a width of change of the focal position of the objective lens with respect to the optical axis direction of the objective lens for each outward path and each inward path of the reciprocation. In this case, even when irregularities on the surface of the sample and warpage of a glass slide and the like mounting the sample are not negligible, determining the width of change of the focal position of the objective lens according to the form of the sample can prevent the reciprocation of the focal position of the objective lens from straying from the surface of the sample. Therefore, the focus information can be calculated more securely.

The focus map producing unit may produce the focus map according to at least one of respective pieces of focus information calculated in outward and inward paths by the reciprocation of the focal position of the objective lens. When the focus map is produced according to one of the respective pieces of information calculated in outward and inward paths, the second drive unit can be controlled easily. When the focus map is produced according to both of the respective pieces of information calculated in outward and inward paths, a greater amount of focus information can be calculated, whereby the accuracy of the focus map can be secured sufficiently.

The focus map producing unit may produce the focus map according to both of respective pieces of focus information calculated in outward and inward paths in the reciprocation of the focal position of the objective lens. In this case, a greater amount of focus information can be calculated, whereby the accuracy of the focus map can be secured sufficiently.

The controller may have an imaging line setting unit for setting a two-dimensional image acquisition region for the sample and configuring a plurality of imaging lines extending in one direction in the image acquisition region, while the controller may select one or a plurality of imaging lines from the imaging lines configured by the imaging line setting unit and control the first drive unit such as to move the field position of the objective lens with respect to the sample for the selected imaging line. In this case, setting the image acquisition region can prevent unnecessary focus information from being calculated in a part where no sample exists. Therefore, the focus map can be produced more rapidly. Selecting the imaging lines can further speed up the processing.

The focus map producing unit may produce the focus map according to the focus information calculated over a plurality of imaging lines. This can improve the accuracy of the focus map.

The controller may synchronize movement of a predetermined part of the sample within the field of the objective lens caused by the first drive unit with the rolling readout of the image pickup element such that each pixel column of the image pickup element is exposed to an optical image of the predetermined part in the sample. As a consequence, image data from each pixel column includes contrast information obtained when the focal position of the objective lens is changed in the same part of the sample, whereby the focus information can be calculated rapidly and accurately according to the contrast information.

The image acquisition method in accordance with one aspect of the present invention is an image acquisition method in an image acquisition device comprising a stage for mounting a sample; a lightguide optical system including an objective lens arranged so as to oppose the sample on the stage; an image pickup element for capturing an optical image of the sample guided by the lightguide optical system; a focus calculation unit for calculating focus information of the sample according to image data from the image pickup element; a focus map producing unit for producing a focus map of the sample according to the focus information; a first drive unit for moving a field position of the objective lens with respect to the sample; a second drive unit for changing a focal position of the objective lens with respect to the sample; and a controller for controlling the image pickup element, first drive unit, and second drive unit; the method comprising using as the image pickup element a two-dimensional image pickup element, adapted to perform rolling readout, having a plurality of pixel columns; causing the controller to control the first and second drive units such as to reciprocate a focal position of the objective lens with respect to the sample in an optical axis direction of the objective lens, while moving a field position of the objective lens with respect to the sample, and acquiring image data by the rolling readout of the image pickup element; and causing the focus map producing unit to produce the focus map according to a plurality of pieces of focus information calculated by the focus calculation unit.

The focus map producing method in accordance with one aspect of the present invention is a method for producing a focus map of a sample by using a two-dimensional image pickup element, adapted to perform rolling readout, having a plurality of pixel columns; the method comprising acquiring image data by the rolling readout of the image pickup element during the time when, while moving a field position of an objective lens with respect to a sample held on a stage, at least one of the stage and objective lens is moved such as to shift a focal position of the objective lens with respect to the sample in an optical axis direction of the objective lens; acquiring focus information of the sample according to the image data; and producing a focus map according to a plurality of pieces of focus information in the sample.

The above-mentioned image acquisition method and method for producing a focus map of a sample shift the focal position of the objective lens with respect to the sample in the height direction of the objective lens (the height direction of the sample) while moving the focal position of the objective lens with respect to the sample. This makes it possible to acquire contrast information of image data at the field position of the objective lens sequentially as the field position moves with respect to the sample. The image acquisition device and method for producing a focus map of a sample acquire the image data by the rolling readout of the image pickup element. This stabilizes the number of pieces of focus information calculated for each scan of the focal position of the objective lens. Therefore, the focus map can be produced rapidly and accurately.

The movement of the focal position of the objective lens with respect to the sample in the optical axis direction of the objective lens (the height direction of the sample) may be reciprocation. This makes it possible to acquire respective pieces of focus information at predetermined parts different from each other in the sample.

The system for producing a focus map of a sample in accordance with one aspect of the present invention comprises a stage for mounting the sample; a lightguide optical system including an objective lens arranged so as to oppose the sample on the stage; an image pickup element for capturing an optical image of the sample guided by the lightguide optical system, the image pickup element being constituted by a two-dimensional image pickup element, adapted to perform rolling readout, having a plurality of pixel columns; a focus calculation unit for calculating focus information of the sample according to image data from the image pickup element; and a focus map producing unit for producing a focus map of the sample according to the focus information; the image pickup element acquires focus information of the sample according to the image data during the time when, while moving a field position of an objective lens with respect to the sample, at least one of the stage and objective lens is moved such as to shift a focal position of the objective lens with respect to the sample in an optical axis direction of the objective lens.

This system shifts the focal position of the objective lens with respect to the sample in the optical axis direction of the objective lens (the height direction of the sample) while moving the field position of the objective lens with respect to the sample. This makes it possible to acquire contrast information of image data at the field position of the objective lens sequentially as the field position moves with respect to the sample. This system also acquires the image data by the rolling readout of the image pickup element. This stabilizes the number of pieces of focus information calculated for each scan of the focal position of the objective lens. Therefore, the focus map can be produced rapidly and accurately.

The movement of the focal position of the objective lens with respect to the sample in the optical axis direction of the objective lens (the height direction of the sample) may be reciprocation. This makes it possible to acquire respective pieces of focus information at predetermined parts different from each other in the sample.

Advantageous Effects of Invention

The present invention can form a focus map rapidly and accurately.

BRIEF DESCRIPTION OF DRAWINGS

FIG. 7 is a diagram illustrating another example of conditions for reciprocation of the focal position of the objective lens;

FIG. 8 is a diagram illustrating still another example of conditions for reciprocation of the focal position of the objective lens;

FIG. 9 is a diagram illustrating an example of contrast information processed by a focus calculation unit; and FIG. 10 is a flowchart illustrating operations of the image acquisition device illustrated in FIG. 1.

DESCRIPTION OF EMBODIMENTS

In the following, preferred embodiments of the image acquisition device and method and system for producing a focus map of a sample will be explained in detail with reference to the drawings.

Figure 1:
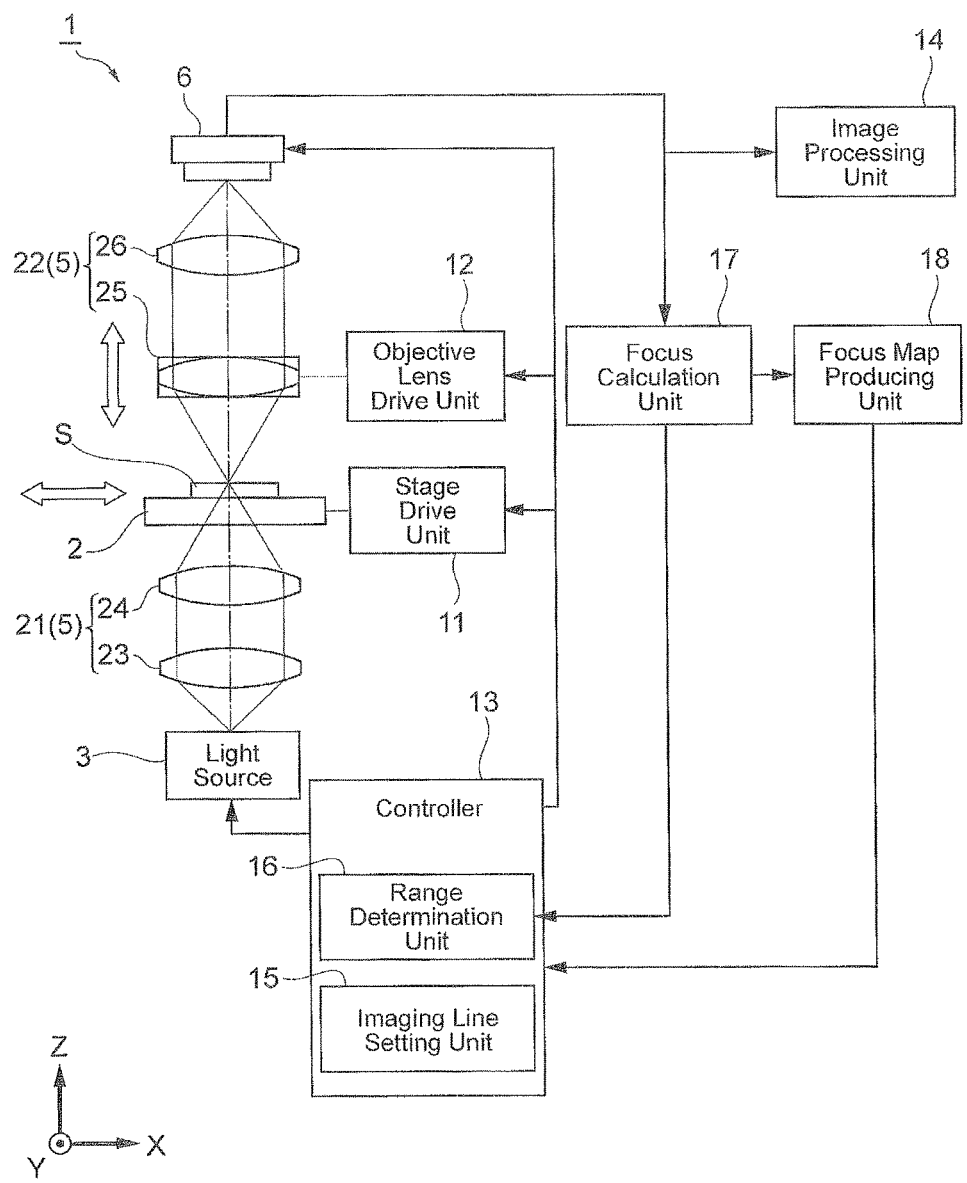
FIG. 1 is a diagram illustrating an embodiment of the image acquisition device in accordance with the present invention.

FIG. 1 is a diagram illustrating an embodiment of the image acquisition device in accordance with the present invention. As illustrated in the diagram, an image acquisition device 1 comprises a stage for mounting a sample S, a light source 3 for emitting light to the sample, a lightguide optical system 5 including an objective lens 25 arranged so as to oppose the sample S on the stage 2, and an image pickup element 6 for capturing an optical image of the sample S guided by the lightguide optical system 5.

The image acquisition device 1 also comprises a stage drive unit (first drive unit) 11 for moving a field position of the objective lens 25 with respect to the sample S, an objective lens drive unit (second drive unit) 12 for changing the focal position of the objective lens 25 with respect to the sample S, a controller 13 for controlling the image pickup element 6, stage drive unit 11, and objective lens drive unit 12, and an image processing unit 14 for processing image data of the sample captured by the image pickup element 6.

The sample S to be observed by the image acquisition device 1, an example of which is a living sample such as a tissue cell, is mounted on the stage 2 while being sealed with a glass slide. The light source 3 is arranged on the bottom face side of the stage 2. For example, any of laser diodes (LD), light-emitting diodes (LED), superluminescent diodes (SLD), and light sources of lamp type such as halogen lamps is used as the light source 3.

The lightguide optical system 5 is constituted by an illumination optical system 21 arranged between the light source 3 and stage 2 and a microscope optical system 22 arranged between the stage 2 and image pickup element 6. The illumination optical system 21 has a Köhler illumination optical system constituted by a condensing lens 23 and a projection lens 24, for example, and guides the light from the light source 3 so as to irradiate the sample S with uniform light. On the other hand, the microscope optical system 22 has an objective lens 25 and an imaging lens 26 arranged on the downstream side (image pickup element 6 side) of the objective lens 25 and guides an optical image of the sample S to the image pickup element 6. The optical image of the sample S is an image formed by transmitted light in the case of bright field illumination, scattered light in the case of dark field illumination, and emission (fluorescence) in the case of emission measurement. It may also be an image formed by reflected light from the sample S. In these cases, optical systems suitable for acquiring the transmitted light image, scattered light image, and emission (fluorescence) light image of the sample S can be employed as the lightguide optical system.

Figure 2:
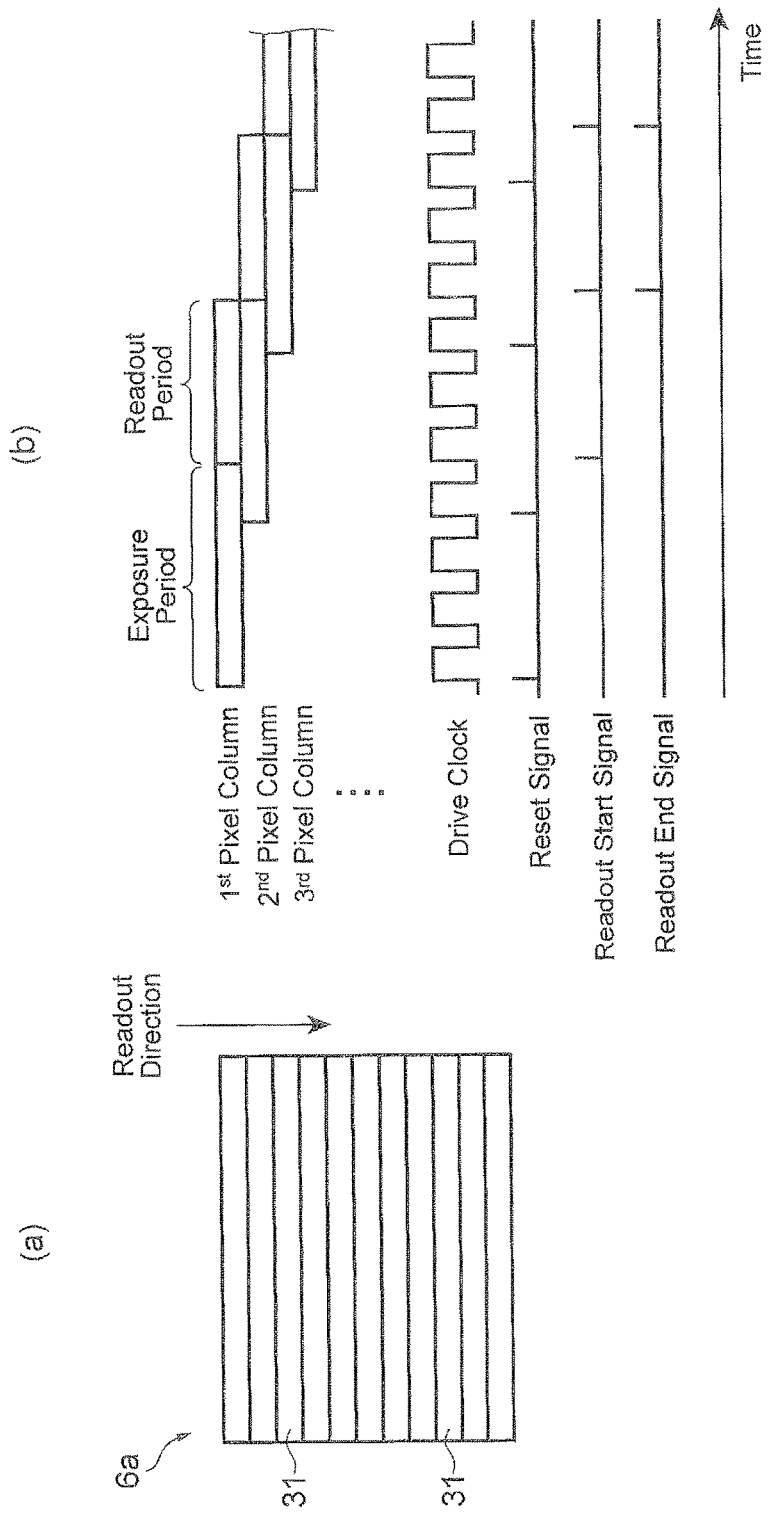
FIG. 2 is a diagram illustrating an example of an image pickup element, in which (a) and (b) represent a light-receiving surface of the image pickup element and rolling readout in the image pickup element, respectively.

The image pickup element 6 is a two-dimensional image pickup element which is adapted to perform rolling readout while having a plurality of pixel columns. An example of such an image pickup element 6 is a CMOS image sensor. As illustrated in FIG. 2(*a*), a plurality of pixel columns 31, each of which is constructed by arranging a plurality of pixels in a direction perpendicular to a readout direction, align in the readout direction on a light-receiving surface 6*a* of the image pickup element 6.

In the image pickup element 6, as illustrated in FIG. 2(*b*), a reset signal, a readout start signal, and a readout end signal are outputted according to a drive period of a drive clock, whereby exposure and readout are controlled for each pixel column 31. An exposure period of one pixel column 31 is a duration from discharge of electric charges triggered by the reset signal to readout of the electric charges triggered by the readout start signal. A readout period of one pixel column 31 is a duration from the start of readout of electric charges triggered by the readout start signal to an end of readout of electric charges triggered by the readout end signal. The readout start signal for the next pixel column can also be used as the readout end signal.

In the rolling readout, readout start signals to be outputted for the respective pixel columns 31 are sequentially outputted with a predetermined time difference. Therefore, unlike global readout in which all the pixel columns are read out at the same time, respective readout operations for the pixel columns 31 are sequentially performed with the predetermined time difference. The readout speed in the rolling readout is controlled by a time interval of the readout start signals for reading the respective pixel columns 31. The readout speed becomes faster and slower as the time interval of readout start signals is shorter and longer, respectively. The readout interval between the pixel columns 31, 31 adjacent to each, other can be adjusted by techniques such as adjustment of the frequency of the drive clock, setting of a delay period in the readout period, and change of a clock number specifying the readout start signal, for example.

The stage drive unit 11 is constituted by a motor or actuator such as a stepping motor (pulse motor) or piezoelectric actuator, for example. Under the control of the controller 13, the stage drive unit 11 moves the stage 2 in the XY directions about a plane having a predetermined angle (e.g., 90°) with respect to a plane orthogonal to the optical axis of the objective lens 25. As a consequence, the sample S secured to the stage 2 moves relative to the optical axis of the objective lens 25, thereby shifting the field position of the objective lens 25 with respect to the sample S.

As with the stage drive unit 11, the objective lens drive unit 12 is constituted by a motor or actuator such as a stepping motor (pulse motor) or piezoelectric actuator, for example. Under the control of the controller 13, the objective lens drive unit 12 moves the objective lens 25 in the Z direction along the optical axis of the objective lens 25. This shifts the focal position of the objective lens 25 with respect to the sample S.

When the stage drive unit 11 can move the stage 2 in the Z direction along the optical axis of the objective lens 25, the controller 13 may cause the stage drive unit 11 to change the position in the Z direction of the stage 2 with respect to the objective lens 25, thereby altering the distance between the stage 2 and objective lens 25. In this case, the stage drive unit 11 serves as a drive unit for moving the focal position of the objective lens 25 with respect to the sample S, thereby fulfilling a function equivalent to that of the objective lens 12.

Figure 3:
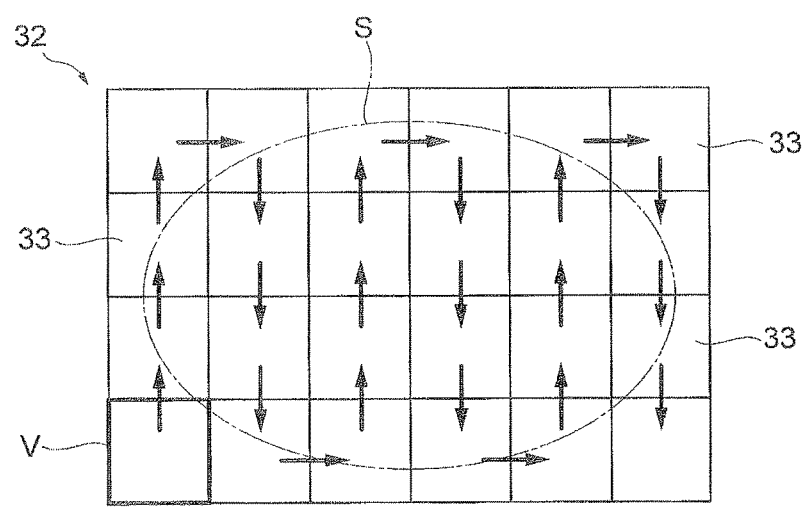
FIG. 3 is a diagram illustrating an example of scanning an image acquisition region with respect to a sample.

The image pickup element 1 performs imaging of the sample S at a high magnification of 20× to 40×, for example. Therefore, the objective lens 25 has a field V which is small with respect to the sample S, whereby a region in which an image can be captured in one imaging operation also becomes small with respect to the sample S as illustrated in FIG. 3. This makes it necessary for the field V of the objective lens 25 to be scanned with respect to the sample S in order to capture an image of the sample S as a whole.

Therefore, this image acquisition device 1 employs an image acquisition scheme known as tiling scan scheme. Specifically, in the image acquisition device 1, the controller 13, which will be explained later, sets an image acquisition region 32 so as to include the sample S with respect to a sample container (e.g., a glass slide) holding the sample S and configures a plurality of divisional regions (tiles) 33 according to the image acquisition region 32 and the field V on the sample S of the objective lens 25. Respective partial images (tile images) of the sample corresponding to the divisional regions 33 are captured and then are combined by the image processing unit 14, so as to produce image data of the sample S as a whole.

For capturing the partial images of the sample S corresponding to the divisional regions 33, the image acquisition device 1 produces a focus map concerning the sample S beforehand in order to determine the focal position of the objective lens 25 with respect to the sample S for each divisional region 33. The image acquisition device 1 is provided with an imaging line setting unit 15 and a range determination unit 16 as functional constituents in the controller 13. The image acquisition device 1 also comprises a focus calculation unit 17 for calculating focus information of the sample S according to the image data from the image pickup element 6 and a focus map producing unit 18 for producing a focus map of the sample S according to the focus information.

Figure 4:
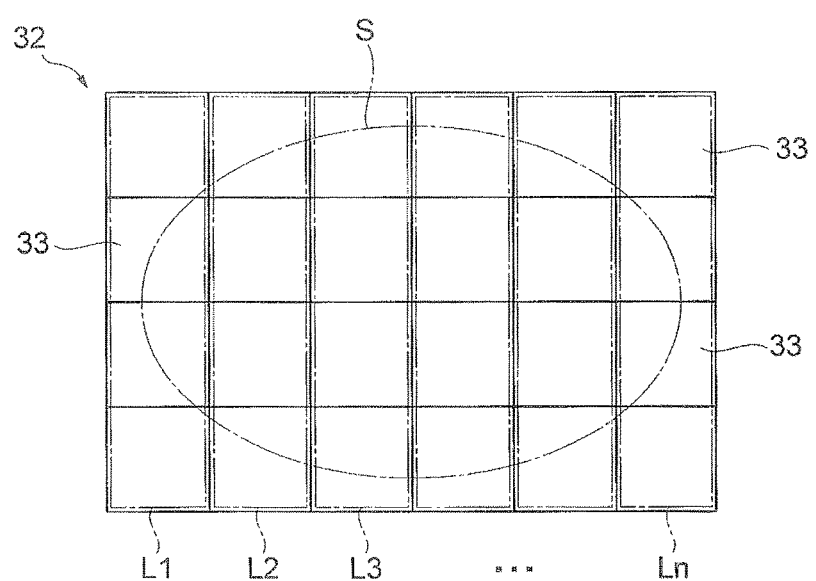
FIG. 4 is a diagram illustrating an example of settings of imaging lines.

The imaging line setting unit 15 is a part which sets a two-dimensional image acquisition region 32 for the sample S and configures a plurality of imaging lines extending unidirectionally in the image acquisition region 32. In an example illustrated in FIG. 4, imaging lines L (L1, L2, L3, . . . , Ln) are set for respective columns of the divisional regions 33 in the image acquisition region 32.

Figure 5:
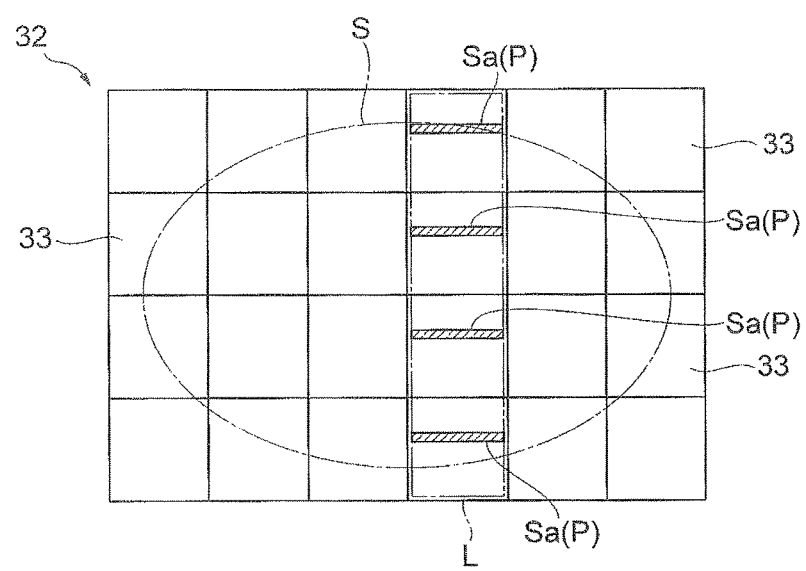
FIG. 5 is a diagram illustrating an example of focus information calculation positions in an imaging line.

For each imaging line set by the imaging line setting unit 15, the controller 13 controls the stage drive unit 11 and objective lens drive unit 12 such that, while the field position V of the objective lens 25 with respect to the sample S moves, the focal position of the objective lens with respect to the sample S reciprocates in the height direction of the sample. The controller 13 also causes the image pickup element 6 to perform rolling readout according to the reciprocation of the focal position of the objective lens 25. At this time, it is preferred for the controller 13 to synchronize the movement of the sample S within the field V of the objective lens 25 caused by the stage drive unit 11 with the rolling readout of the image pickup element 6 such that each pixel column 31 is exposed to an optical image of the same part in the sample S. At a timing when the readout of one frame ends, the readout of the next frame is started, which enables a predetermined part Sa of the sample S used for calculating the focus information to appear at fixed intervals as illustrated in FIG. 5, thereby forming at least one focus information calculation position P in each divisional region 33 included in the imaging line L.

The range determination unit 16 is a part which determines a condition for reciprocation of the focal position of the objective lens 25 with respect to the sample S in the optical axis direction of the objective lens 25 (the height direction of the sample S) caused by the objective lens drive unit 12. According to the condition determined by the range determination unit 16, the controller 13 controls the driving of the objective lens 25 by the objective lens drive unit 12 so as to repeatedly expand and reduce the distance (gap) in the Z direction between the objective lens 25 and stage 2 (specific examples of which will be explained later).

The focus calculation unit 17 is a part which calculates focus information of the sample S according to the image data from the image pickup element 6. Specifically, the image processing unit 14 calculates the focus information of the sample S according to the image data from each pixel column 31 of the image pickup element 6. An example of the focus information is positional information in the Z direction of the objective lens 25 or stage 2 at which the sample S coincides with the focal position of the objective lens 25. It may also be the position in the Z direction of the objective lens 25, the height (gap) of the objective lens 25 with respect to the sample S (stage 2), the position in the Z direction of the stage 2, or the height (gap) of the sample S (stage 2) with respect to the objective lens 25, for example.

As mentioned above, the controller 13 makes the stage drive unit 11 move the predetermined part Sa of the sample S within the field V of the objective lens 25 and the image pickup element 6 perform the rolling readout, while causing the objective lens drive unit 12 to change the focal position of the objective lens 25. More preferably, the controller 13 synchronizes the movement of the predetermined part Sa of the sample S within the field V of the objective lens 25 caused by the stage drive unit 11 with the rolling readout of the image pickup element 6 such that each pixel column 31 of the image pickup element 6 is exposed to an optical image of the predetermined part Sa in the sample S. For example, it synchronizes the movement of the stage 2 caused by the stage drive unit 11 with the rolling readout of the image pickup element 6. Therefore, in order for each pixel column 31 to be exposed to the optical image of the predetermined part Sa of the sample 5, the image data from the image pickup element 6 at the time when the focal position is acquired includes contrast information at the time when the focus information of the objective lens 25 is changed in the predetermined part Sa of the sample S.

Figure 6:
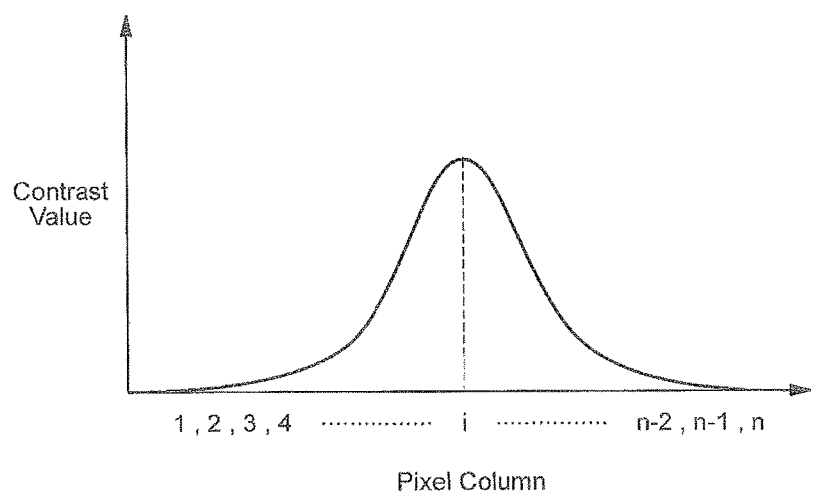
FIG. 6 is a diagram illustrating an example of conditions for reciprocation of a focal position of an objective lens.

FIG. 6 is a diagram illustrating an example of contrast information processed by the focus calculation unit. The example illustrated in the diagram represents contrast values of image data from the first pixel column 31 to the $n^{th}$ pixel column 31 in the imaging region, in which the contrast value of the image data in the $i^{th}$ pixel column 31 is a peak value. In this case, assuming that the focal position of the objective lens 25 is an in-focus position when exposing the $i^{th}$ pixel column to the predetermined part Sa of the sample S, the focus information is generated. As the contrast value, the one in a specific pixel in the pixels included in each pixel column 31 or an average value of contrast values in part or whole of the pixels included in each pixel column 31 may be used.

FIG. 7 is a diagram illustrating an example of conditions for reciprocation of the focal position of the objective lens 25 determined by the above-mentioned range determination unit 16. In the example illustrated in FIG. 7(a), a width of change W1 of the focal position of the objective lens 25 in the outward direction (the descending direction with respect to the sample S here) and a width of change W2 of the focal position of the objective lens 25 in the inward direction (the ascending direction with respect to the sample S here) are the same. A start position a1 for changing the focal position of the objective lens 25 into the outward direction and an end position b2 for changing the focal position of the objective lens 25 into the inward direction coincide with each other, while a start position b1 for changing the focal position of the objective lens 25 into the inward direction and an end position a2 for changing the focal position of the objective lens 25 into the outward direction coincide with each other.

When such a reciprocation condition is used, the focal position of the objective lens 25 is changed sequentially in the outward and inward directions by the same width for each focus information calculation position P in the sample S as illustrated in FIG. 7(b). Then, within the width of change of the focal position of the objective lens 25, a position coinciding with the surface of the sample S is calculated as an in-focus position F (by a method which will be explained later).

FIG. 8 is a diagram illustrating another example of conditions for reciprocation of the focal position of the objective lens 25 determined by the range determination unit 16. In the example illustrated in FIG. 8, a turning point of reciprocation of the focal position of the objective lens 25 is determined according to the focus information having already been calculated at the focus information calculation position P prior to one focus information calculation position P. More specifically, when changing the focal position of the objective lens 25 into the outward or inward direction at one focus information calculation position P, the in-focus position F calculated at the preceding focus information calculation position P is referred to, and the start position a1 or b1 for changing the focal position of the objective lens 25 is determined such that the in-focus position F is located at substantially the center position of the width of change W1, W2.

Using such a reciprocation condition can prevent the reciprocation of the focal position of the objective lens 25 from straying from the surface of the sample S even when irregularities on the surface of the sample S and warpage of a glass slide and the like mounting the sample S are not negligible. Therefore, the focus information can be calculated more securely.

FIG. 9 is a diagram illustrating still another example of conditions for reciprocation of the focal position of the objective lens 25 determined by the range determination unit 16. In the example illustrated in FIG. 9, the width of change of the focal position of the objective lens 25 in the optical axis direction of the objective lens 25 (the height direction of the sample S) is variable for each of the inward and outward paths of reciprocation. More specifically, in addition to determining the turning point of reciprocation of the focal position of the objective lens 25 according to the focus information having already been calculated at the focus information calculation position P prior to one focus information calculation position P as illustrated in FIG. 8, the example illustrated in FIG. 9 makes the width of change W3 for initially changing the focal position of the objective lens 25 with respect to the sample S greater than each of its subsequent widths of change W1, W2 of the focal position of the objective lens 25 in the outward and inward directions.

Using such a reciprocation condition makes it easy to find the initial in-focus position F, whereupon subsequent focus information can be calculated more securely. Making the widths of change W1, W2 of the focal position of the objective lens 25 smaller than the width of change W3 for the focus information calculation positions P other than the initial focus information calculation position P can slow down the driving speed of the objective lens 25 when the focal position of the objective 25 is changed at a fixed time for each focus information calculation position P. Therefore, a sufficient calculation accuracy for focus information can be secured. The focus information calculation position P at which the width of change is altered is not limited to the initial focus information calculation position P; the width of change of the focal position of the objective lens 25 can be made variable at any focus information calculation position P, for example, when positions where irregularities of the sample and warpage of the glass slide are greatly influential can be predicted.

The focus map producing unit 18 is a part which produces a focus map according to a plurality of pieces of focus information calculated by the focus calculation unit 17. More specifically, the focus map producing unit 18 produces a focus map according to the focus information calculated over a plurality of imaging lines L. For producing the focus map, the in-focus positions F themselves at the respective focus information calculation positions P may be used, or focus planes may be calculated by applying the method of least squares or the like to the in-focus positions F at the respective focus information calculation positions P and combined together. The focus map produced by the focus map producing unit 18 is outputted to the controller 13, so as to be referred to for controlling the focal position of the objective lens 25 with respect to the sample S when capturing a partial image of the sample S.

The focus map producing unit 18 may produce the focus map according to one or both of the focus information calculated in the outward path and the focus information calculated in the inward path. The former requires the driving accuracy of only one of the outward and inward paths in the reciprocation of the objective lens 25, which makes it easier to control the objective lens 25. The latter can calculate a greater number of pieces of focus information and thus can secure a sufficient accuracy of the focus map.

Operations of the above-mentioned image acquisition device 1 will now be explained. FIG. 10 is a flowchart illustrating operations of the image acquisition device 1.

First, as illustrated in FIG. 10, the image acquisition region 32 is set for the sample S mounted on the stage 2 in the image acquisition device 1 (step S01). A plurality of imaging lines L are configured for thus set image acquisition region 32 (step S02). Subsequently, while moving the field position V of the objective lens 25 with respect to the sample S, the focal position of the objective lens 25 with respect to the sample S reciprocates in the height direction of the sample, and the movement of the predetermined part Sa of the sample S within the field V of the objective lens 25 and the rolling readout of the image pickup element 6 are performed, so as to calculate focus information per imaging line L (step S03). At the step S03, the movement of the predetermined part Sa of the sample S within the field V of the objective lens 25 is preferably synchronized with the rolling readout of the image pickup element 6 such that each pixel column 31 is exposed to an optical image of light of the predetermined part Sa in the sample S.

After calculating focus information for each imaging line L, a focus map is produced according to the calculated focus information (step S04). Then, an image (partial image) of each divisional region 33 of the image acquisition region 32 is acquired while locating the focal position of the objective lens 25 at the sample S according to the produced focus map (step S05), and such partial images are combined, so as to make a total image of the sample S (step S06).

As explained in the foregoing, the image acquisition device 1 reciprocates the focal position of the objective lens 25 with respect to the sample S while moving the field position V of the objective lens 25 with respect to the sample S. This makes it possible to acquire contrast information of image data at the field position V of the objective lens 25 sequentially as the field position V moves with respect to the sample S. The image acquisition device 1 also causes the image pickup element 6 to perform rolling readout as the focal position of the objective lens 25 reciprocates. This stabilizes the number of pieces of focus information calculated for each scan of the focal position of the objective lens 25. Therefore, the focus map can be produced rapidly and accurately. The image acquisition device 1 uses a two-dimensional image pickup element adapted to perform rolling readout as the image pickup element 6 and thus can reduce noise at the time of acquiring image data and secure an accuracy of the focus map.

In the image pickup element 1, a condition for the reciprocation of the focal position of the objective lens 25 with respect to the sample S in the optical axis direction of the objective lens 25 (the height direction of the sample S) caused by the objective lens drive unit 12 is determined by the range determination unit 16. Though there may be a case where irregularities on the surface of the sample S and warpage of a glass slide and the like mounting the sample S are not negligible, focus information can be calculated more securely for various samples S if the condition for the reciprocation of the focal position of the objective lens 25 is determined.

The image pickup device 1 controls the stage controller 11 such as to set the two-dimensional image acquisition region 32 for the sample S, configure a plurality of imaging lines L extending unidirectionally in the image acquisition region 32, and move the field position V of the objective lens 25 along the imaging lines L. Such control can prevent unnecessary focus information from being calculated in a part where no sample exists. Therefore, the focus map can be produced more rapidly.

Preferably, the image acquisition device 1 synchronizes the movement of the predetermined part Sa of the sample S within the field V caused by the stage drive unit 11 with the rolling readout of the image pickup element 6 such that each pixel column 31 of the image pickup element 6 is exposed to the optical image of the predetermined part Sa in the sample S. As a consequence, image data from each pixel column 31 of the image pickup element 6 includes contrast information obtained when the focal position of the objective lens 25 is changed in the same part of the sample S, whereby the focus information can be calculated rapidly and accurately according to the contrast information.

The present invention is not limited to the above-mentioned embodiment. For example, one focus information calculation position P, which is scanned with the focal position of the objective lens 25 only once in one of the outward and inward directions, may be scanned a plurality of times. When the sample S is a tissue cell, its thickness is about 10 µm, for example. Therefore, when the moving distance of the focal position of the objective lens 25 for each pixel column 31 is set to about 0.1 µm, contrast information can be acquired for the total thickness of the sample S by about 100 pixel columns. In contrast, a two-dimensional image pickup element such as a CMOS image sensor has about several thousands of pixel columns, for example, whereby contrast information can be acquired a plurality of times during one frame. Consequently, by reciprocating the objective lens 25 in the height direction, a plurality of pieces of focus information can be calculated for one focus information calculation position P, whereby the focus map can be produced more accurately.

Though the above-mentioned embodiment captures partial images of the sample S according to the focus map produced for the sample S as a whole after calculating the focus information for all the imaging lines L, a partial image of the sample S may be obtained by acquiring focus information and producing a focus map for one imaging line L, and this may be repeatedly executed for all the imaging lines L. Instead of acquiring the focus information for all the imaging lines L, the controller 13 may select one or a plurality of the set imaging lines L and acquire focus information for thus selected imaging lines L. The selection of imaging lines L is not limited in particular; a plurality of imaging lines L including the imaging lines L adjacent to each other may be selected, or the imaging lines L may be selected at intervals of one or a plurality of columns. This can produce the focus map rapidly.

Though the above-mentioned embodiment illustrates the tiling scan scheme as the image acquisition scheme, the present invention is also applicable to the line scan scheme. In the latter case, a beam splitter for splitting light from the objective lens 25 may be arranged between the objective lens 25 and imaging lens 26, for example, so that light split by the beam splitter is captured by a CCD image sensor which can transfer electric charges, such as a line sensor or a TDI (Time delay Integration) sensor.

REFERENCE SIGNS LIST

1: image acquisition device; 2: stage; 3: light source; 5: lightguide optical system; 6: image pickup element; 11: stage drive unit (first drive unit); 12: objective lens drive unit (second drive unit); 13: controller; 15: imaging line setting unit; 16: range determination unit; 17: focus calculation unit; 18: focus map producing unit; 25: objective lens; 31: pixel column; 32: image acquisition region; L: imaging line; S: sample; Sa: predetermined part of the sample; V: objective lens field.

The invention claimed is:

1. An apparatus for capturing an image comprising:
a stage configured to support a sample;
an objective lens configured to face to the sample;
a two-dimensional image sensor including a plurality of pixel columns and configured to capture an optical image of the sample and perform rolling readout of the image sensor, wherein the plurality of pixel columns are arranged in a direction perpendicular to a readout direction;
one or more processors configured to perform operations comprising:
calculating focus information of the sample according to image data from the image sensor; and
generating a focus map of the sample according to the focus information;
a first motor or actuator configured to move a field position of the objective lens with respect to the sample;
a second motor or actuator configured to change a focal position of the objective lens with respect to the sample; and
a controller configured to:
control the image sensor, first motor or actuator, and second motor or actuator;
control the first motor or actuator and second motor or actuator so as to reciprocate the focal position of the objective lens with respect to the sample in an optical axis direction of the objective lens while moving the field position of the objective lens with respect to the sample to acquire the image data by the rolling readout of the image sensor as each line of the optical image is scanned such that each of the plurality of pixel columns of the image sensor is sequentially exposed to an optical image of a predetermined part in the sample with a predetermined time difference, wherein an exposure period for one of the plurality of pixel columns of the image sensor overlaps with a portion of an exposure period for a second of the plurality of pixel columns of the image sensor based upon the predetermined time difference; and
wherein a rolling readout speed in the rolling readout is controlled by a time interval of readout start signals for reading respective pixel columns, and
the moving speed of the sample within the field of the objective lens is synchronized with the rolling readout speed of the image sensor.

2. The apparatus according to claim 1, wherein the controller is configured to determine a condition for the reciprocation of the focal position of the objective lens with respect to the sample in the optical axis direction of the objective lens caused by the second motor or actuator.

3. The apparatus according to claim 2, wherein, when calculating one piece of focus information, the controller determines the focal position of the objective lens at a turning point of the reciprocation according to a piece of focus information calculated before the one piece of focus information.

4. The apparatus according to claim 2, wherein the controller varies a width of change of the focal position of the objective lens with respect to the optical axis direction of the objective lens for each outward path and each inward path of the reciprocation.

5. The apparatus according to claim 1, wherein the generator generates the focus map according to at least one of respective pieces of focus information calculated in outward and inward paths by the reciprocation of the focal position of the objective lens.

6. The apparatus according to claim 1, wherein the controller is configured to set a two-dimensional image acquisition region for the sample and configure a plurality of imaging lines extending in one direction in the image acquisition region; and
wherein the controller selects one or a plurality of imaging lines from the imaging lines and controls the first motor or actuator such as to move the field position of the objective lens with respect to the sample for the selected imaging line.

7. The apparatus according to claim 6, wherein the generator generates the focus map according to the focus information calculated over the plurality of imaging lines.

8. The apparatus according to claim 1, wherein the controller synchronizes movement of the predetermined part of the sample within the field of the objective lens caused by the first motor or actuator with the rolling readout of the image sensor such that each pixel column of the image sensor is exposed to an optical image of the predetermined part in the sample.

9. A method for producing a focus map of a sample by using a two-dimensional image sensor, adapted to perform rolling readout, including a plurality of pixel columns, the method comprising:
calculating focus information of the sample according to image data from the image sensor;

acquiring image data by the rolling readout of the image sensor as each line of the optical image is scanned during the time when, while moving a field position of an objective lens with respect to a sample held on a stage, at least one of the stage and objective lens is moved such as to shift a focal position of the objective lens with respect to the sample in an optical axis direction of the objective lens to adjust focus, wherein each of the plurality of pixel columns of the image sensor is sequentially exposed to an optical image of a predetermined part in the sample with a predetermined time difference, wherein an exposure period for one of the plurality of pixel columns of the image sensor overlaps with a portion of an exposure period for a second of the plurality of pixel columns of the image sensor based upon the predetermined time difference;

acquiring focus information of the sample according to the image data; and producing a focus map according to a plurality of pieces of focus information in the sample, wherein a rolling readout speed in the rolling readout is controlled by a time interval of readout start signals for reading respective pixel columns, and the moving speed of the sample within the field of the objective lens is synchronized with the rolling readout speed of the image sensor.

10. A system for producing a focus map of a sample, the system comprising:

a stage configured to support a sample;
an objective lens configured to face to the sample;
a two-dimensional image sensor configured to:
 capture an optical image of the sample; and
 perform rolling readout of the image sensor, wherein the image sensor comprises a plurality of pixel columns arranged in a direction perpendicular to a readout direction;

one or more processors configured to perform operations comprising:
 calculating focus information of the sample according to image data from the image sensor; and
 generating a focus map of the sample according to the focus information;

wherein the image sensor acquires focus information of the sample according to the image data to acquire image data as each line of the optical image is scanned during the time when, while moving a field position of an objective lens with respect to the sample, at least one of the stage and objective lens is moved such as to shift a focal position of the objective lens with respect to the sample in an optical axis direction of the objective lens to adjust focus, wherein each of the plurality of pixel columns of the image sensor is sequentially exposed to an optical image of a predetermined part in the sample with a predetermined time difference, wherein an exposure period for one of the plurality of pixel columns of the image sensor overlaps with a portion of an exposure period for a second of the plurality of pixel columns of the image sensor based upon the predetermined time difference, wherein a rolling readout speed in the rolling readout is controlled by a time interval of readout start signals for reading respective pixel columns, and the moving speed of the sample within the field of the objective lens is synchronized with the rolling readout speed of the image sensor.

* * * * *